US012331895B1

(12) United States Patent
Chen

(10) Patent No.: US 12,331,895 B1
(45) Date of Patent: Jun. 17, 2025

(54) DECORATIVE LIGHT BULB AND DECORATIVE LIGHT STRING

(71) Applicant: Guangdong Lianrun Intelligent Technology Co., Ltd., Guangdong (CN)

(72) Inventor: Kunpeng Chen, Jiujiang (CN)

(73) Assignee: Guangdong Lianrun Intelligent Technology, Huizhou (CN)

( * ) Notice: Subject to any disclaimer, the term of this patent is extended or adjusted under 35 U.S.C. 154(b) by 0 days.

(21) Appl. No.: 18/755,050

(22) Filed: Jun. 26, 2024

(51) Int. Cl.

| | |
|---|---|
| ***F21S 4/10*** | (2016.01) |
| ***F21V 17/06*** | (2006.01) |
| ***F21V 19/00*** | (2006.01) |
| ***F21V 23/00*** | (2015.01) |
| *F21Y 103/10* | (2016.01) |

(52) U.S. Cl.
CPC ................ *F21S 4/10* (2016.01); *F21V 17/06* (2013.01); *F21V 19/006* (2013.01); *F21V 23/001* (2013.01); *F21Y 2103/10* (2016.08)

(58) Field of Classification Search
CPC .......... F21S 4/10; F21V 17/06; F21V 19/006; F21V 23/001
See application file for complete search history.

(56) References Cited

U.S. PATENT DOCUMENTS

| | | | | |
|---|---|---|---|---|
| 5,021,935 | A * | 6/1991 | Gary | F21S 4/10 362/255 |
| 10,047,913 | B1 * | 8/2018 | Hsu | H01K 1/34 |
| 2023/0204170 | A1 * | 6/2023 | Lee | F21S 4/10 315/167 |

* cited by examiner

*Primary Examiner* — Abdulmajeed Aziz
*Assistant Examiner* — Nathaniel J Lee
(74) *Attorney, Agent, or Firm* — Justin Lampel

(57) ABSTRACT

Provided are a decorative light bulb and a decorative light string. The decorative light bulb includes: a base, a light-emitting unit, a lamp pole, and a lamp shade, where the lamp pole is fixedly assembled with the base by ways of the lamp shade, and the base is detachably assembled with the lamp shade. Due to adoption of the above technical solution, the decorative light bulb not only is convenient to assemble, and protects the light-emitting unit and the base, but is also conducive to the replacement of the lamp shade, so that the service life of the decorative light bulb is prolonged.

10 Claims, 9 Drawing Sheets

DECORATIVE LIGHT BULB AND DECORATIVE LIGHT STRING

TECHNICAL FIELD

The present disclosure relates to the technical field of lamps, and particularly relates to a decorative light bulb and a decorative light string.

BACKGROUND

With the continuous improvement of people's living standards, decorative lights are often used in life to decorate scenes, foil atmosphere or add beauty. Due to adoption of an integrated design, the lamp shades of the traditional decorative lights are generally inconvenient to install.

SUMMARY

With respect to the defects and shortcomings of the prior art, the first object of the present disclosure is to provide a decorative light bulb, which has the advantages of being convenient in lamp shade assembly and disassembly, long in service life, and good in heat dissipation effect.

In order to achieve the above object, the present disclosure adopts the following technical solution: a decorative light bulb includes: a base, having two electrical connection contacts; a light-emitting unit, one end of the light-emitting unit being inserted into the base and connected to an interior of the base, the light-emitting unit having two electrodes, and the two electrodes being electrically connected to the two electrical connection contacts respectively; a lamp pole, sleeved on the light-emitting unit, one end of the lamp pole close to the base being inserted into the base and connected to the base; and a lamp shade, detachably connected to the base, both the light-emitting unit and the lamp pole protruding out from the lamp shade and extending towards the side away from the base.

In one of the embodiments, the base includes: a threaded joint, the two electrical connection contacts being disposed on the threaded joint; and a mounting base, connected to the threaded joint, a mounting cavity being provided on an end face of the mounting base on the side away from the threaded joint, and one end of the light-emitting unit being inserted into the mounting cavity and fixedly connected to an inner wall of the mounting cavity.

In one of the embodiments, a mounting table is disposed on the inner side wall of the mounting cavity, and the lamp pole includes: a pole body, having an accommodating cavity, the light-emitting unit being accommodated in the accommodating cavity; and an assembly end, inserted into the mounting cavity and abutted against the mounting table, the assembly end being fixedly connected to the mounting table and a side wall of the mounting cavity.

In one of the embodiments, the lamp shade includes: a lower shade body, detachably connected to the mounting base; and an upper shade body, detachably assembled with the side of the lower shade body away from the threaded joint, a mounting hole being reserved in the middle of the upper shade body, and the lamp pole passing through the mounting hole.

In one of the embodiments, a limiting portion protrudes from an inner side wall of the lower shade body on the side away from the upper shade body; a limiting platform and limiting blocks are disposed on an outer side wall of the mounting base in a protruding manner; and when the lower shade body is assembled with the mounting base, the limiting portion is limited between the limiting platform and the limiting blocks.

In one of the embodiments, the limiting portion is provided with mounting notches, and the limiting blocks can enter the lower shade body through the mounting notches; and after the limiting blocks enter the lower shade body, the mounting base or the lower shade body is rotated to make the limiting blocks be matched with the limiting platform to limit and fix the limiting portion.

In one of the embodiments, clamping columns are disposed on the side of the upper shade body close to the lower shade body, and clamping grooves are provided on the side of the lower shade body close to the upper shade body; and/or, the clamping grooves are provided on the side of the upper shade body close to the lower shade body, the clamping columns are disposed on the side of the lower shade body close to the upper shade body, and the clamping grooves are fitted with the clamping columns so as to enable the upper shade body to be detachably connected to the lower shade body.

In one of the embodiments, a positioning column is disposed on an end face of the upper shade body on the side close to the lower shade body, and the lower shade body is provided with a positioning hole fitted with the positioning column.

In one of the embodiments, a plurality of abutting sheets extending toward the side away from the upper shade body along the axis direction of the mounting hole are disposed on an inner side wall of the mounting hole, and abutting blocks are disposed on end faces of the plurality of abutting sheets on the sides close to the lamp pole in a protruding manner; and when the lamp pole passes through the mounting hole, the abutting blocks abut against an outer wall of the lamp pole so as to fix the lamp pole.

In one of the embodiments, the upper shade body and the lower shade body are both provided with through holes.

With respect to the defects and shortcomings of the prior art, the first object of the present disclosure is to provide a decorative light bulb, which has the advantages of being convenient to transport, easy to assembly and disassemble, and simple and fast in lamp shade replacement.

A decorative light string includes a plurality of spliceable decorative lights, where each of the decorative lights includes: the decorative light bulb as described above; and a lamp holder, connected to the decorative light bulb, the lamp holder being configured to connect adjacent decorative light bulbs or to be connected to an external power source.

In one of the embodiments, the lamp holder includes: a lamp holder body, having an assembly cavity, a positive electrode conductive sheet and a negative electrode conductive sheet being disposed inside the assembly cavity, and the light-emitting unit being installed inside the assembly cavity and electrically connected to the positive electrode conductive sheet and the negative electrode conductive sheet; a power cord, a middle part of the power cord being separately connected to the positive electrode conductive sheet and the negative electrode conductive sheet, a connector being disposed at an end portion of the power cord; and a bottom cover, detachably assembled with the lamp holder body, the bottom cover being configured to block one end of the lamp holder body away from the light-emitting unit, and to press and fix the power cord.

In one of the embodiments, the lamp holder body is further provided with buckling portions and buckling holes, and the bottom cover includes: a blocking portion, connected to the lamp holder body; an accommodating portion, connected to an end face of the blocking portion on the side away from the light-emitting unit; buckling heads, extending into the buckling holes to be connected to the buckling portions so as to enable the bottom cover to be fixedly connected to the lamp holder body; and an abutting portion, abutted against the power cord, where after the buckling heads are connected to the buckling portions, the abutting portion abuts against the power cord so as to fix the power cord on the lamp holder body.

In one of the embodiments, a positioning block is disposed at an edge of the blocking portion, and a positioning groove fitted with the positioning block is provided in the lamp holder body.

In one of the embodiments, the lamp holder body is provided with a bayonet, and the power cord is accommodated inside the bayonet; the abutting portion is provided with a radially extending groove, and the power cord is accommodated within the groove; and the bayonet is matched with the groove to limit the power cord.

According to the decorative light bulb disclosed by the present disclosure, the lamp shade is detachably assembled with the base, which not only facilitates the assembly of the decorative light bulb, and protects the light-emitting unit and the base, but is also conducive to the replacement of the lamp shade, so that the service life of the decorative light bulb is prolonged.

According to the decorative light string disclosed by the present disclosure, the decorative lights can be disassembled and spliced, allowing a user to assemble the decorative light string of a desired length by splicing the decorative lights according to the size of the scene. Furthermore, the decorative light string can be dismounted for transportation and storage during transportation, thus improving the convenience of transportation and storage. In addition, the above decorative light bulb used not only is convenient to assemble, and protects the light-emitting unit and the base, but is also conducive to the replacement of the lamp shade, so that the service life of the decorative light bulb is prolonged.

BRIEF DESCRIPTION OF FIGURES

In order to provide a clearer explanation of the embodiments of the present disclosure or the technical solutions in the prior art, a brief introduction will be given below to the accompanying drawings required for describing the embodiments or the prior art. Apparently, the accompanying drawings in the following description are only some embodiments of the present disclosure, and those of ordinary skill in the art may further obtain other drawings based on these accompanying drawings without creative efforts.

DESCRIPTION OF REFERENCE NUMERALS

Figure 1:
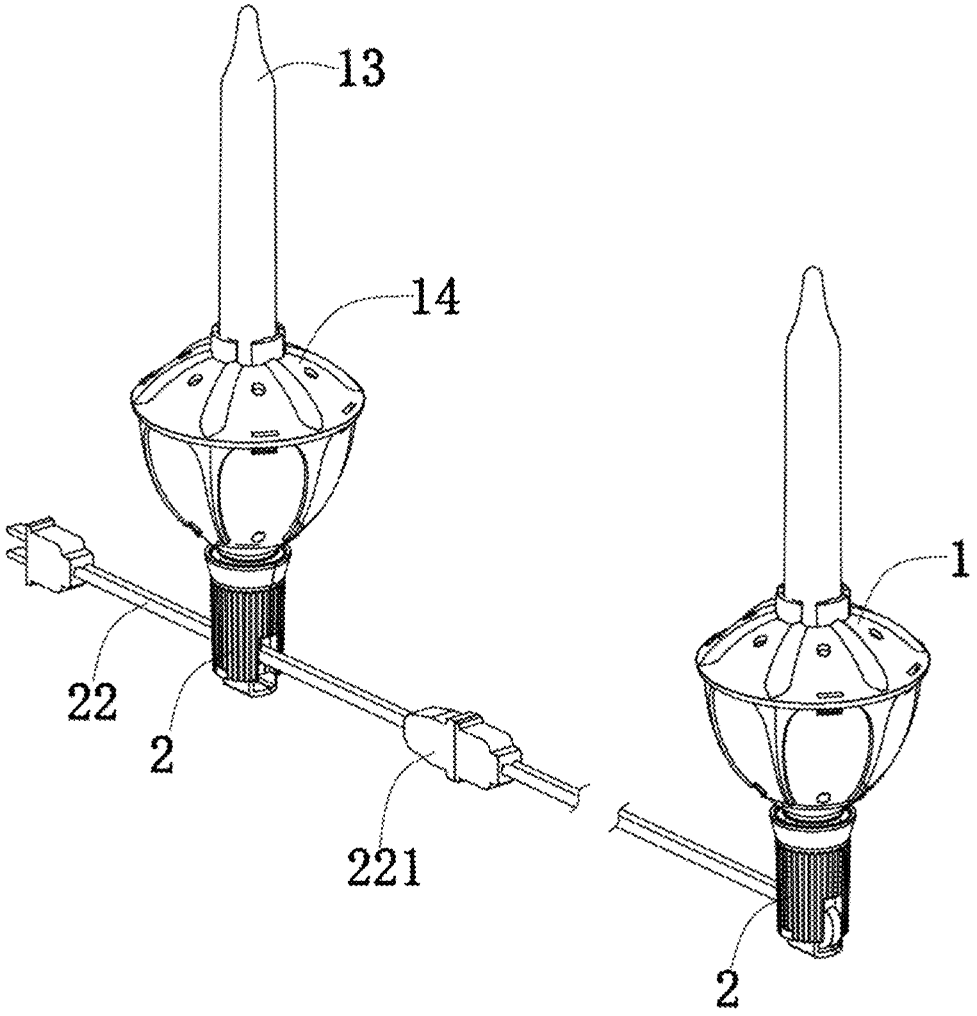
FIG. 1 is a schematic diagram of the overall structure of a decorative light string in an embodiment of the present disclosure.

1 denotes a decorative light bulb; 11 denotes a base; 111 denotes a threaded joint; 112 denotes a mounting base; 1120 denotes a mounting cavity; 1121 denotes a mounting table; 1122 denotes a limiting platform; 1123 denotes limiting blocks; 12 denotes a light-emitting unit; 121 denotes luminous bodies; 13 denotes a lamp pole; 131 denotes a pole body; 132 denotes an assembly end; 14 denotes a lamp shade; 141 denotes a lower shade body; 1410 denotes mounting notches; 1411 denotes a limiting portion; 1412 denotes clamping grooves; 1413 denotes a positioning hole; 142 denotes an upper shade body; 1421 denotes clamping columns; 1422 denotes a positioning column; 1423 denotes a mounting hole; 1424 denotes abutting sheets; 1425 denotes abutting blocks; 143 denotes through holes; 2 denotes a lamp holder; 21 denotes a lamp holder body; 210 denotes an assembly cavity; 211 denotes a positive electrode conductive sheet; 2111 denotes a first tip; 212 denotes a negative electrode conductive sheet; 2121 denotes a second tip; 213 denotes an assembly table; 214 denotes buckling portions; 215 denotes buckling holes; 216 denotes a limiting bulge; 217 denotes a positioning groove; 218 denotes a bayonet; 22 denotes a power cord; 221 denotes a connector; 23 denotes a bottom cover; 231 denotes a blocking portion; 2311 denotes a positioning block; 232 denotes an accommodating portion; 2321 denotes an accommodating groove; 233 denotes buckling heads; 234 denotes an abutting portion; and 2341 denotes a groove.

DETAILED DESCRIPTION

The solutions in embodiments of the present disclosure will be described clearly and completely hereinafter with reference to the accompanying drawings in the embodiments of the present disclosure. Apparently, the described embodiments are only a part rather than all of the embodiments of the present disclosure. Based on the embodiments of the present disclosure, all other embodiments obtained by those of ordinary skill in the art without making creative efforts shall fall within the protection scope of the present disclosure.

In the description of the present disclosure, it should be noted that the orientations or positional relationships indicated by the terms such as “center”, “upper”, “lower”, “left”, “right”, “vertical”, “horizontal”, “inner”, and “outer” are based on the orientations or positional relationships shown in the drawings, which are only for convenience in describing the present disclosure and simplifying the description, and do not indicate or imply that the devices or elements referred to must have particular orientations, or must be constructed and operated in particular orientations. Therefore, it cannot be construed as a limitation on the present disclosure. In addition, the terms “first”, “second”, and "third" are only used for descriptive purposes, and thus cannot be understood as indicating or implying relative importance.

In the description of the present disclosure, it should be noted that unless otherwise explicitly specified or defined, the terms such as "mount", "install", "connect", and "connection" should be understood in a broad sense. For example, the connection may be a fixed connection, a replaceable connection, or an integral connection; or the connection may be a mechanical connection or an electrical connection; or the connection may be a direct connection, an indirect connection through an intermediary, or internal communication between two elements. Those of ordinary skill in the art could understand the specific meanings of the above terms in the present disclosure according to specific situations.

Figure 2:
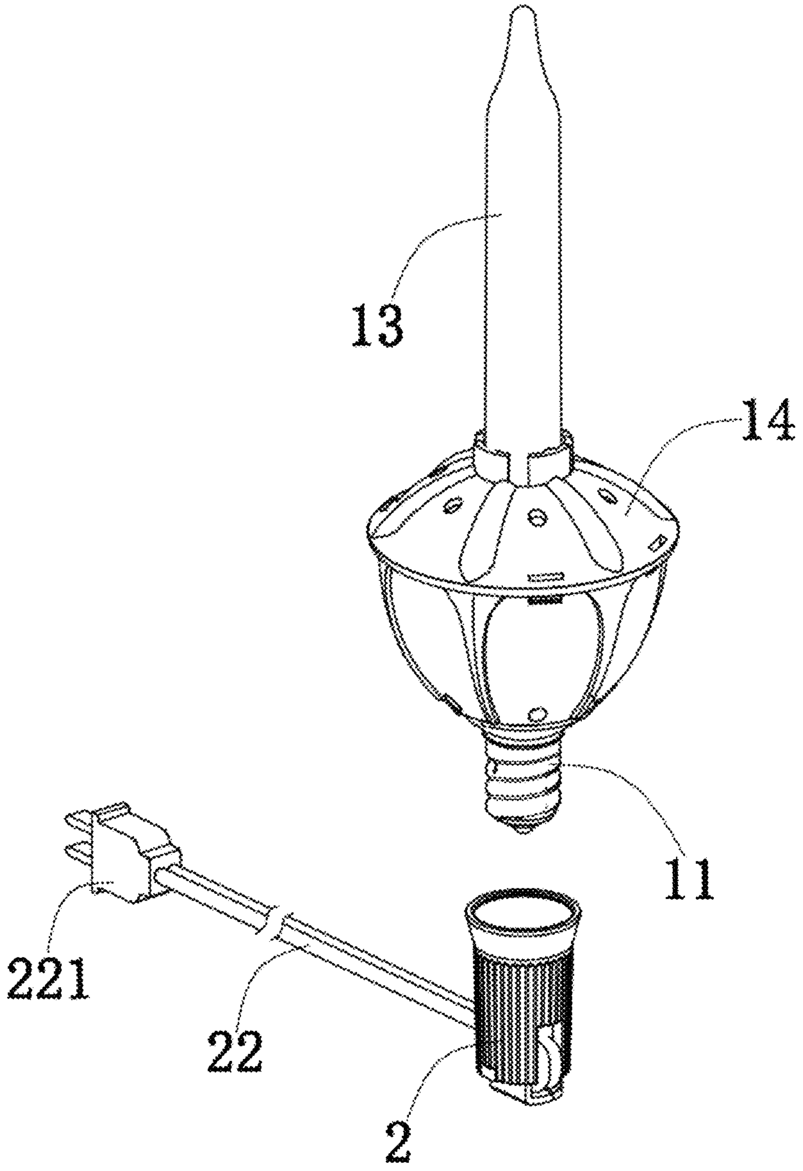
FIG. 2 is an exploded view of a decorative light in an embodiment of the present disclosure.
Figure 3:
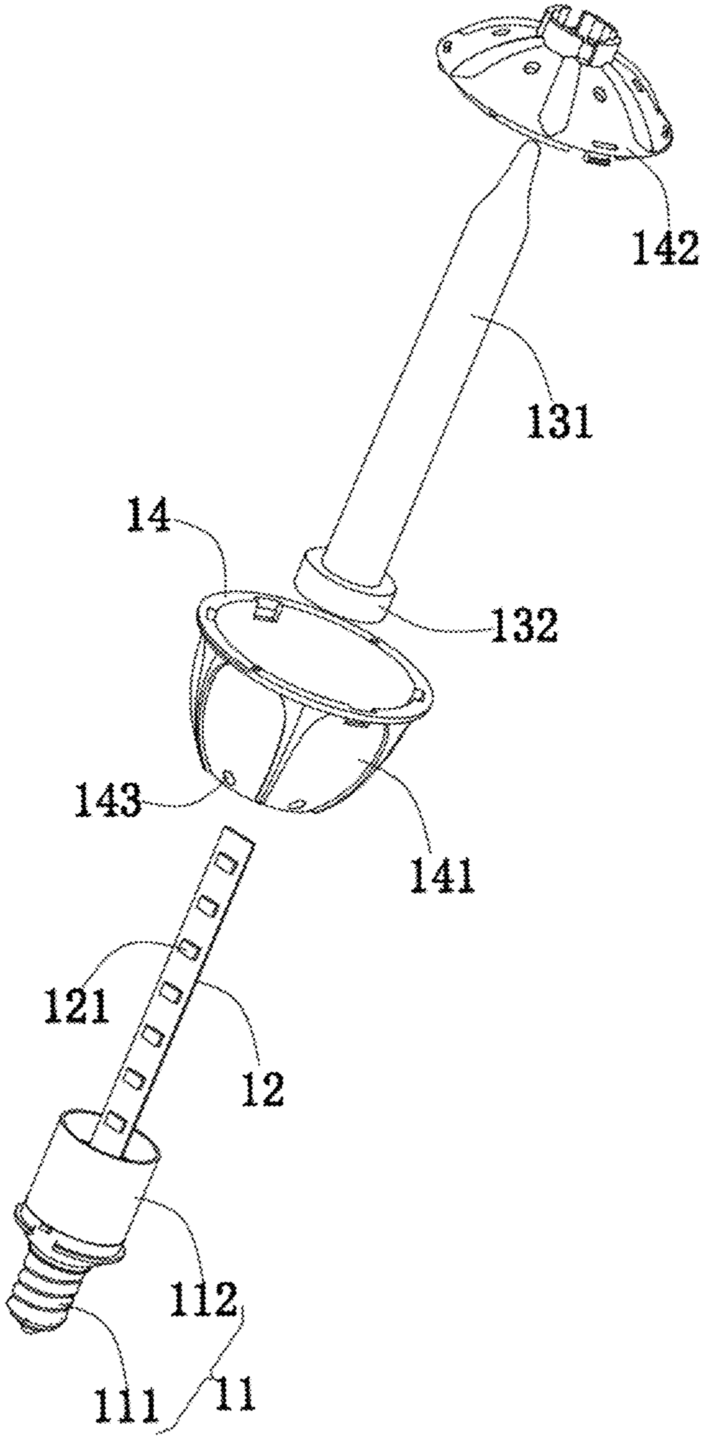
FIG. 3 is an exploded view of a decorative light bulb in an embodiment of the present disclosure.
Figure 4:
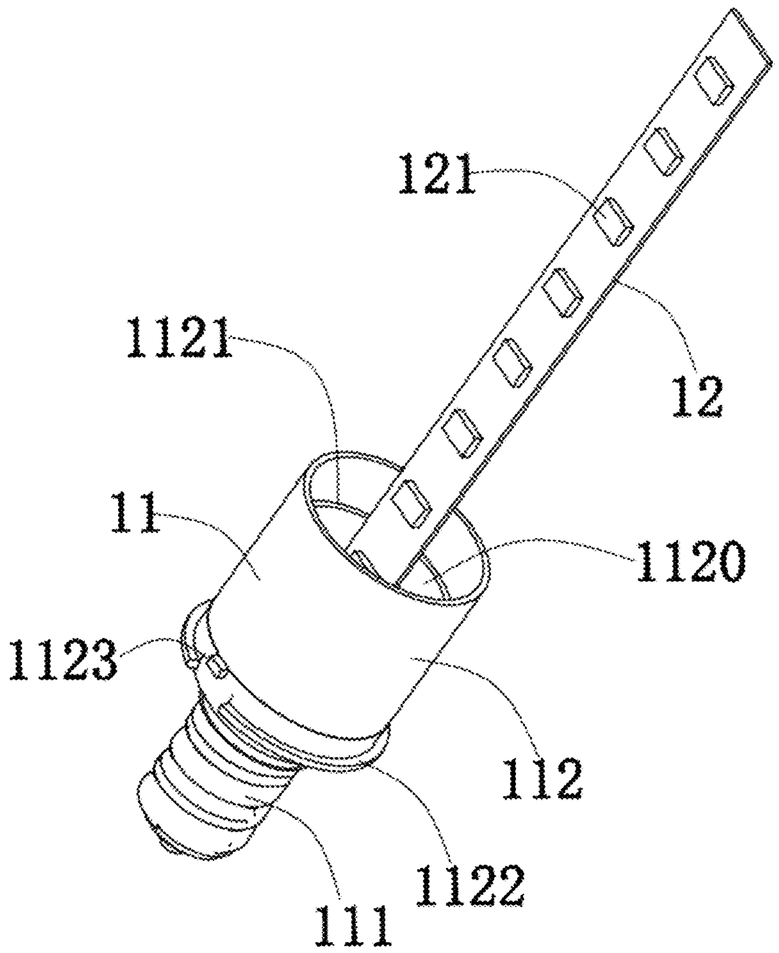
FIG. 4 is a schematic diagram of the structure of a base and a light-emitting unit of a decorative light bulb in an embodiment of the present disclosure.
Figure 5:
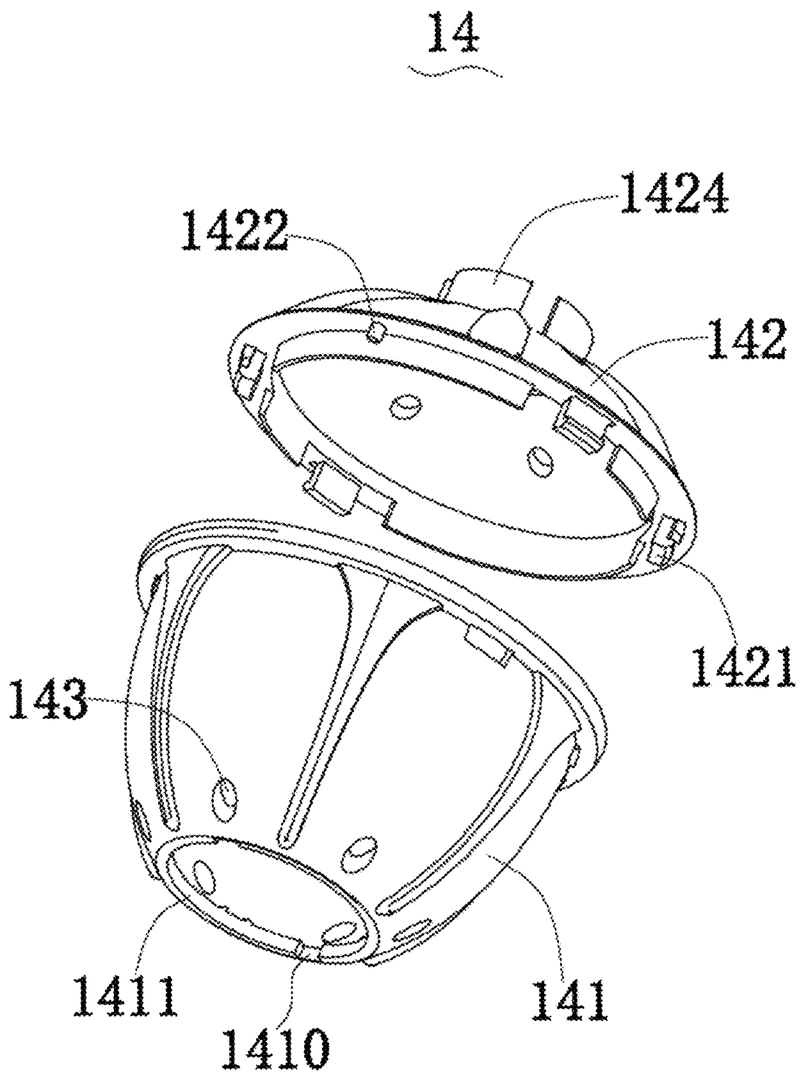
FIG. 5 is a first exploded view of a lamp shade of a decorative light bulb in an embodiment of the present disclosure.
Figure 6:
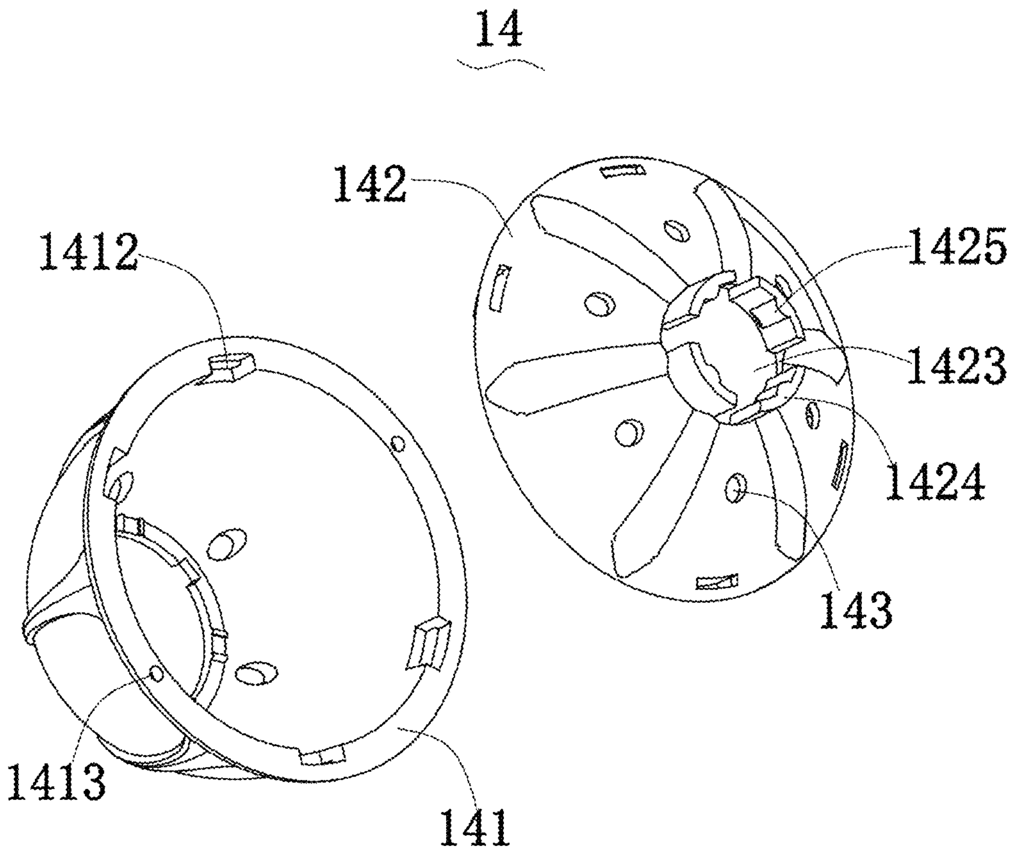
FIG. 6 is a second exploded view of a lamp shade of a decorative light bulb in an embodiment of the present disclosure.
Figure 7:
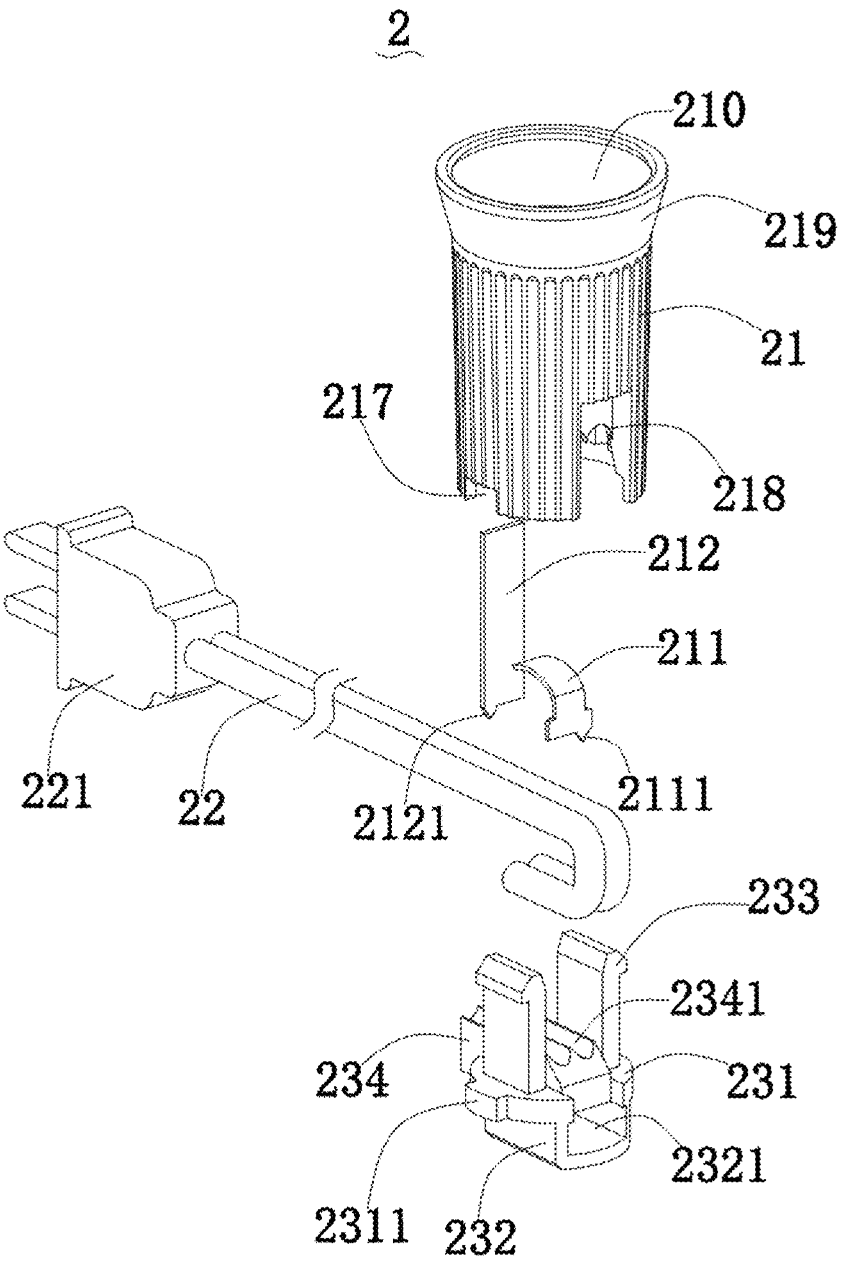
FIG. 7 is a schematic diagram of the structure of a lamp holder of a decorative light string in an embodiment of the present disclosure.
Figure 8:
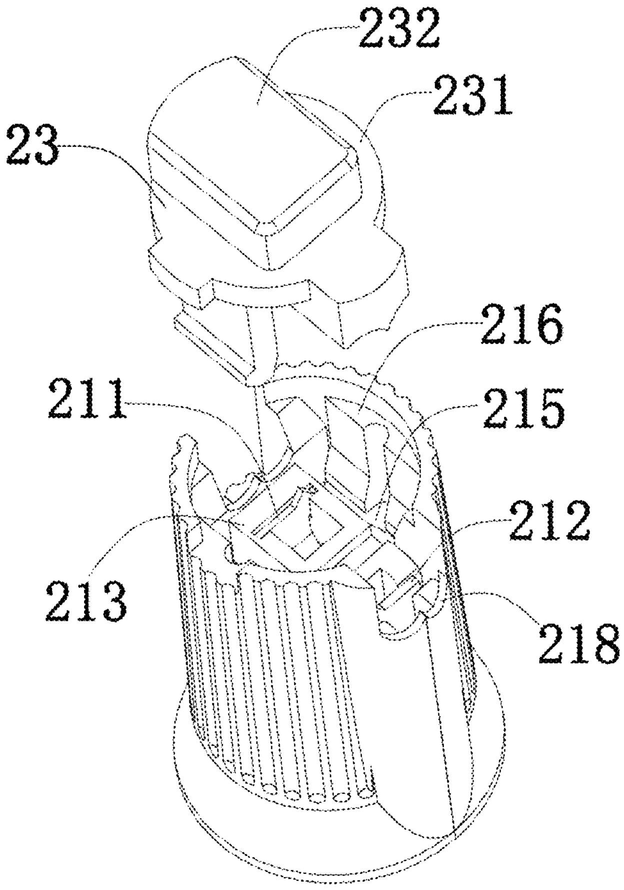
FIG. 8 is a schematic diagram of the structure of a lamp holder body and a bottom cover in an embodiment of the present disclosure.
Figure 9:
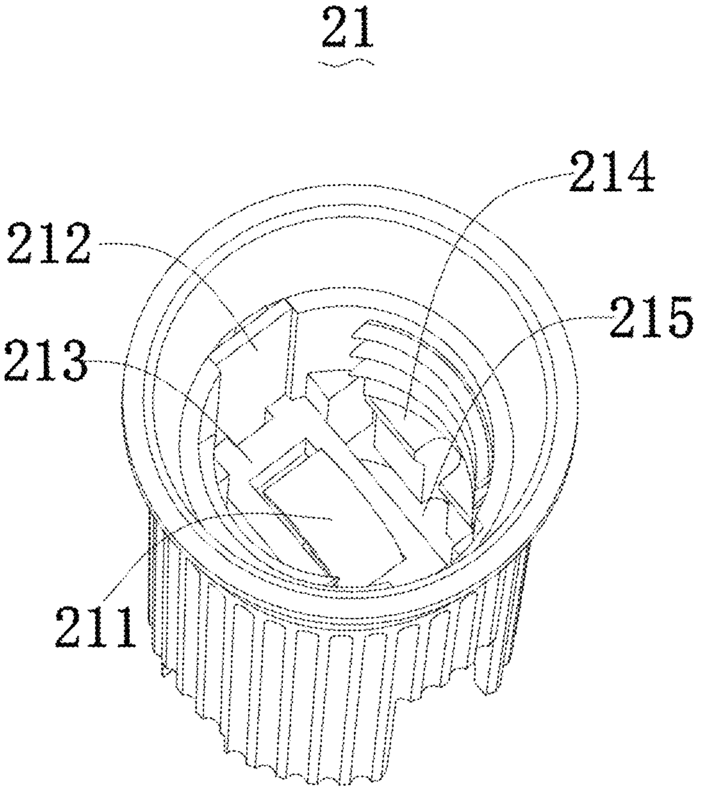
FIG. 9 is a schematic diagram of the structure of a lamp holder body in an embodiment of the present disclosure.

Referring to FIG. 1 to FIG. 9, this embodiment relates to a decorative light string, the decorative light string is mainly used in parks, squares, residence communities, streets, courtyards, and other places. It should be noted that, in this embodiment, the decorative light string includes a plurality of decorative lights, and the plurality of decorative lights can be used in combination in a splicing manner, so that a user can freely splice the decorative lights for use according to the number as required, thereby improving the diversity and universality of use of the decorative light string.

Referring to FIG. 1 to FIG. 6, in one of the embodiments, a decorative light includes a decorative light bulb 1 and a lamp holder 2 connected to the decorative light bulb 1. Specifically, the decorative light bulb 1 can be energized to emit light, and the decorative light bulb 1 is detachably installed on the lamp holder 2. The lamp holder 2 can not only achieve splicing between adjacent decorative lights, but also can be connected to an external power source to supply power to all decorative lights.

In one of the embodiments, the decorative light bulb 1 includes: a base 11, a light-emitting unit 12, a lamp pole 13, and a lamp shade 14. Specifically, the base 11 is detachably connected to the lamp holder 2. The base 11 has two electrical connection contacts, and the base 11 is electrically connected to the lamp holder 2 by ways of the two electrical connection contacts. One end of the light-emitting unit 12 is inserted into the base 11 and connected to an interior of the base 11, and the other end of the light-emitting unit extends towards the side away from the base 11. The light-emitting unit 12 has two electrodes (not shown in the drawings), and the two electrodes are electrically connected to the two electrical connection contacts respectively, so that the light-emitting unit 12 is electrically connected to the lamp holder 2 indirectly. The lamp pole 13 is sleeved on the light-emitting unit 12. One end of the lamp pole 13 close to the base 11 is inserted into the base 11 and connected to the base 11. The lamp shade 14 is detachably connected to the base 11, and the light-emitting unit 12 and the lamp pole 13 both pass through the lamp shade 14 and extend a certain distance towards the side away from the base 11.

It should be noted that the light-emitting unit 12 is provided with a plurality of luminous bodies 121, and the plurality of luminous bodies 121 are distributed at equal intervals along the axial direction of the lamp pole 13. The plurality of luminous bodies 121 can sequentially emit light from bottom to top or from top to bottom so as to enable the light generated by the decorative light bulb 1 to have a flowing effect, thereby improving the decorativeness of the decorative light bulb 1. In this embodiment, the light-emitting unit 12 is fixedly mounted on an inner wall of the base 11 by glue.

Continuing to refer to FIG. 1 to FIG. 6, in one of the embodiments, the base 11 includes a threaded joint 111 and a mounting base 112. An external thread is provided on an outer side wall of the threaded joint 111, and the threaded joint 111 is detachably connected to the lamp holder 2 by ways of the external thread. The mounting base 112 is connected to the threaded joint 111, a mounting cavity 1120 is provided on an end face of the mounting base 112 on the side away from the threaded joint 111, and one end of the light-emitting unit 12 is inserted into the mounting cavity 1120 and fixedly connected to an inner wall of the mounting cavity 1120.

In one of the embodiments, a mounting table 1121 is disposed on the inner side wall of the mounting cavity 1120. The lamp pole 13 includes a pole body 131 and an assembly end 132. The pole body 131 has an axially extending accommodating cavity (not shown in the drawings), and the light-emitting unit 12 is accommodated in the accommodating cavity. The assembly end 132 is inserted into the mounting cavity 1120 and abutted against the mounting table 1121. The assembly end 132 is fixedly connected to the mounting table 1121 and the inner side wall of the mounting cavity 1120. In this embodiment, the assembly end 132 is fixedly connected to the mounting table 1121 and the inner side wall of the mounting cavity 1120 by an adhesive.

In one of the embodiments, the lamp shade 14 includes: a lower shade body 141 and an upper shade body 142. The lower shade body 141 is detachably connected to the mounting base 112. The upper shade body 142 is detachably assembled with the side of the lower shade body 141 away from the threaded joint 111. The lamp pole 13 passes through an end surface of the upper shade body 142 on the side away from the lower shade body 141.

It should be noted that the mounting base 112 and a part where the mounting base 112 is connected to the lamp pole 13 are covered by the lamp shade 14, so that the mounting base 112 and the part where the mounting base 112 is connected to the lamp pole 13 are protected. Therefore, the mounting base 112 and the part where the mounting base 112 is connected to the lamp pole 13 are prevented from being exposed to the sun, wet in the rain or being stepped on, prolonging the service life of the decorative light bulb 1.

Continuing to refer to FIG. 1 to FIG. 6, in one of the embodiments, a limiting portion 1411 protrudes from an inner side wall of the lower shade body 141 on the side away from the upper shade body 142. A limiting platform 1122 and limiting blocks 1123 are disposed on an outer side wall of the mounting base 112 in a protruding manner. When the lower shade body 141 is assembled with the mounting base 112, the limiting portion 1411 is limited between the limiting platform 1122 and the limiting blocks 1123, so as to achieve a fixed assembly between the mounting base 112 and the lower shade body 141.

Specifically, the limiting portion 1411 is provided with mounting notches 1410. When the lower shade body 141 is assembled with the mounting base 112, the limiting blocks 1123 can enter the lower shade body 141 through the mounting notches 1410; and after the limiting blocks 1123 enter the lower shade body 141, the mounting base 112 or the lower shade body 141 is rotated to make the limiting blocks 1123 be tightly attached to an upper end face of the limiting portion 1411 and to make the limiting platform 1122 be tightly attached to a lower end face of the limiting portion 1411 meanwhile, so that the limiting portion 1411 is limited and fixed, and the lower shade body 141 is enabled to be fixedly assembled with the base 11. It should be noted that, in this embodiment, two mounting notches 1410 are formed, and the two mounting notches 1410 are symmetrically formed. The two limiting blocks 1123 are likewise provided.

In one of the embodiments, clamping columns 1421 are disposed on the side of the upper shade body 142 close to the lower shade body 141, and clamping grooves 1412 are provided on the side of the lower shade body 141 close to the upper shade body 142; and/or, the clamping grooves 1412 are provided on the side of the upper shade body 142 close to the lower shade body 141, and the clamping columns 1421 are disposed on the side of the lower shade body 141 close to the upper shade body 142. The clamping columns 1421 are fitted with the clamping grooves 1412 so as to enable the upper shade body 142 to be detachably connected to the lower shade body 141.

It should be noted that, in this embodiment, the clamping columns 1421 are disposed on the upper shade body 142, and the clamping grooves 1412 are provided in the lower shade body 141. Three clamping columns 1421 are provided, and the three clamping columns 1421 are distributed on the upper shade body 142 at equal intervals in an annular shape. Correspondingly, three clamping grooves 1412 are provided, and the three clamping grooves 1412 are distributed on the lower shade body 141 at equal intervals in an annular shape.

Continuing to refer to FIG. 1 to FIG. 6, in one of the embodiments, a positioning column 1422 is disposed on an end face of the upper shade body 142 on the side close to the lower shade body 141. The lower shade body 141 is provided with a positioning hole 1413 fitted with the positioning column 1422. When the lower shade body 141 is assembled with the upper shade body 142, the positioning column 1422 is firstly enabled to be aligned with the positioning hole 1413; by matching the positioning column 1422 with the positioning hole 1413, a positioning function for the assembly of the lower shade body 141 and the upper shade body 142 is achieved, and thus the clamping columns 1421 and the clamping grooves 1412 are quickly aligned and assembled, which is conducive to the rapid assembly between the upper shade body 142 and the lower shade body 141.

In one of the embodiments, a mounting hole 1423 is reserved on the side of the upper shade body 142 away from the lower shade body 141, and the mounting hole 1423 penetrates through a side wall of the upper shade body 142. The lamp pole 13 passes through the mounting hole 1423. a plurality of abutting sheets 1424 extending toward the side away from the upper shade body 142 along the axis direction of the mounting hole 1423 are disposed on an inner side wall of the mounting hole 1423, and the plurality of abutting sheets 1424 abut against an outer side wall of the lamp pole 13 so as to fix the lamp pole 13.

In one of the embodiments, abutting blocks 1425 are disposed on end faces of the plurality of abutting sheets 1424 on the sides close to the lamp pole 13 in a protruding manner. When the lamp pole 13 passes through the mounting hole 1423, the abutting blocks 1425 abut against the outer wall of the lamp pole 13 so as to fix the lamp pole 13. It should be noted that the arrangement of the abutting blocks 1425 can make the amount of elastic deformation of the abutting sheets 1424 towards the side away from the lamp pole 13 larger, so that the abutting blocks 1425 are enabled to abut against the lamp pole 13 more firmly.

In one of the embodiments, the upper shade body 142 and the lower shade body 141 are both provided with a plurality of through holes 143. A large amount of heat is generated during the operation of the light-emitting unit 12, and the generated heat is largely accumulated in the lamp shade 14, so that the plurality of through holes 143 are reserved to quickly remove the heat generated by the light-emitting unit 12, which is conducive to prolonging the service life of the light-emitting unit 12. In addition, due to arrangement of the through holes 143, the rainwater can also be quickly discharged out of the lamp shade 14 in a rainy day.

In one of the embodiments, the lamp holder 2 includes: a lamp holder body 21, a power cord 22, and a bottom cover 23. Specifically, the lamp holder body 21 is provided with an assembly cavity 210, and a positive electrode conductive sheet 211 and a negative electrode conductive sheet 212 are disposed inside the assembly cavity 210. The decorative light bulb 1 is connected to the side of the assembly cavity 210 away from the bottom cover 23, and is electrically connected to the positive electrode conductive sheet 211 and the negative electrode conductive sheet 212. A middle part of the power cord 22 is separately connected to the positive electrode conductive sheet 211 and the negative electrode conductive sheet 212. A connector 221 is disposed at an end portion of the power cord 22, and the connector 221 is configured to connect adjacent lamp holder bodies 21 and can be connected to an external power source to supply power to a decorative light string. The bottom cover 23 is detachably assembled with the lamp holder body 21, and is configured to block one end of the assembly cavity 210 of the lamp holder body 21. When the bottom cover 23 is connected to the lamp holder body 21, the power cord 22 can also be pressed and fixed by the bottom cover.

It should be noted that a hemispherical convex point protrudes from one end of the threaded joint 111 away from the mounting base 112, and the hemispherical convex point is a first electrical connection contact. The external thread structure of the threaded joint 111 is a second electrical connection contact. When the decorative light bulb 1 is assembled with the lamp holder 2, the first electrical connection contact abuts against the positive electrode conductive sheet 211 to achieve electrical connection, and the second electrical connection contact abuts against the negative electrode conductive sheet 212 to achieve electrical connection.

Referring to FIG. 1, FIG. 2, and FIG. 7 to FIG. 9, in an embodiment, an assembly table 213 is disposed at one side of the assembly cavity 210 close to the bottom cover 23, and the assembly table 213 is connected to an inner wall of the assembly cavity 210. A mounting groove (not shown in the drawings) is provided in the middle of the assembly table 213, and the positive electrode conductive sheet 211 is mounted inside the mounting groove. One end of the positive electrode conductive sheet 211 is connected to the power cord 22, and the other end of the positive electrode conductive sheet is connected to the first electrical connection contact of the decorative light bulb 1. A plug-in slot (not shown in the drawings) extending along the axial direction of the lamp holder body 21 is formed in a side wall of the assembly cavity 210, and the negative electrode conductive sheet 212 is inserted into the plug-in slot and connected to the lamp holder body 21. One end of the negative electrode conductive sheet 212 is connected to the power cord 22, and the other end of the negative electrode conductive sheet is connected to the second electrical connection contact of the decorative light bulb 1.

It should be noted that, in this embodiment, the connector 221 is composed of a power plug and a power socket that can be adapted to each other. When a plurality of decorative lights are spliced and combined to form a decorative light string, the connectors 221 are configured to enable one decorative light to be connected to the power socket of the other adjacent decorative light by ways of the power plug, and so on; and therefore, the decorative light string is formed by splicing the decorative lights. The decorative light string provided in this way can be obtained by splicing the decorative lights according to the length as desired, thus being simple and convenient to use.

It should be particularly noted that, for the decorative light located at a tail part of the decorative light string, the connector 221 is provided on only one end of the power cord 22, and the bottom cover 23 is accommodated on the other end of the power cord, so that an end portion of the power cord 22 is prevented from being exposed. In other embodiments, the connector 221 may also be composed of a USB plug and a USB socket that can be adapted to each other. In other words, the connector 221 only needs to be able to meet the effects of connection and conduction.

In one of the embodiments, a first tip 2111 is provided on the side of the positive electrode conductive sheet 211 away from the decorative light bulb 1; and a second tip 2121 is provided on the side of the negative electrode conductive sheet 212 away from the decorative light bulb 1. When the bottom cover 23 is buckled with the lamp holder body 21, the bottom cover 23 presses the power cord 22 towards the side where the light-emitting unit 12 is positioned, which causes the first tip 2111 and the second tip 2121 to respectively pierce into different sub wires inside the power cord 22, and allows the first tip and the second tip to be connected to conductive portions of the sub wires, thus achieving an electrical connection between the power cord 22 and the positive electrode conductive sheet 211 as well as the negative electrode conductive sheet 212, and further achieving an electrical connection between the decorative light bulb 1 and the power cord 22. Due to this arrangement, the convenience of installation between the power cord 22 and the lamp holder body 21 can be greatly improved, which is conducive to the production and assembly of the decorative lights.

Continuing to refer to FIG. 1, FIG. 2, and FIG. 7 to FIG. 9, in one of the embodiments, the lamp holder body 21 is further provided with buckling portions 214 and buckling holes 215, and the buckling portions 214 are located on the sides of the buckling holes 215 away from the bottom cover 23. A part of the bottom cover 23 passes through the buckling holes 215 and is buckled with the buckling portions 214, so that the bottom cover 23 is detachably connected to the lamp holder body 21.

In an embodiment, the bottom cover 23 includes: a blocking portion 231, an accommodating portion 232, buckling heads 233, and an abutting portion 234. Specifically, the blocking portion 231 is connected to the side of the lamp holder body 21 away from the decorative light bulb 1 so as to block one end of the assembly cavity 210. The accommodating portion 232 is connected to an end face of the blocking portion 231 on the side away from the decorative light bulb 1, and the accommodating portion 232 is configured to accommodate the end portion of the power cord 22 on the tail decorative light, so that the end portion of the power cord 22 is prevented from being exposed, and the service safety and overall aesthetics of the decorative light string are guaranteed. The buckling heads 233 pass through the buckling holes 215 and are abutted against the buckling portions 214 to detachably fix the bottom cover 23 and the lamp holder body 21. The abutting portion 234 is provided on the side of the blocking portion 231 close to the decorative light bulb 1. After the buckling heads 233 are connected to the buckling portions 214, the power cord 22 is abutted against and fixed on the lamp holder body 21 by ways of the abutting portion 234.

It should be noted that, in this embodiment, the accommodating portion 232 is provided with an accommodating groove 2321, and the end portion of the power cord 22 of the tail decorative light is accommodated inside the accommodating groove 2321, so that the overall aesthetics of the lamp holder is guaranteed, the end exposure of the power cord 22 is avoided, and the service safety of the decorative light string is ensured. A limiting bulge 216 is formed on the side of the lamp holder body 21 close to the bottom cover 23. When the buckling heads 233 are matched with the buckling portions 214, the blocking portion 231 is abutted against the limiting bulge 216. On the one hand, the blocking portion 231 can be prevented from being completely mounted inside the assembly cavity 210, and the end face of the blocking portion 231 on the side away from the decorative light bulb 1 is flush with the end face of the lamp holder body 21 on the side away from the decorative light bulb 1, so that the overall assembly aesthetics of the lamp holder 2 is further improved. On the other hand, the buckling heads 233 and the buckling portions 214 can be buckled and locked, so as to prevent the buckling heads 233 from extending too long and losing the buckling function.

It should also be noted that two buckling heads 233 are provided, and correspondingly, the two buckling holes 215 and the two buckling portions 214 are provided. Moreover, in this embodiment, fixed ends of the buckling heads 233 are connected to the blocking portion 231, and free ends of the buckling heads extend towards the side where the decorative light bulb 1 is located. The free ends of the two buckling heads 233 slightly expand outward towards the opposite sides, so that the free ends of the buckling head 233 can be quickly buckled with the buckling portions 214 after extending out of the buckling holes 215, thereby improving the firmness of installation.

Continuing to refer to FIG. 1, FIG. 2, and FIG. 7 to FIG. 9, in one of the embodiments, a positioning block 2311 is disposed on the blocking portion 231, and a positioning groove 217 is provided in the lamp holder body 21. When the lamp holder body 21 is assembled with the bottom cover 23, the positioning block 2311 is matched with the positioning groove 217, so that the rapid dismounting of the lamp holder body 21 and the bottom cover 23 is facilitated, and the convenience of disassembly and assembly is improved.

In one of the embodiments, the abutting portion 234 is located between the two buckling heads 233, and a radially extending groove 2341 is provided on the side of the abutting portion 234 away from the blocking portion 231. The lamp holder body 21 is provided with a bayonet 218, and the power cord 22 is snapped into the bayonet 218. After the bottom cover 23 is assembled with the lamp holder body 21, the groove 2341 is matched with the bayonet 218 so as to limit the power cord 22.

It should be noted that both ends of the abutting portion 234 protrude out from a side wall of the blocking portion 231; and after the bottom cover 23 is assembled with the lamp holder body 21, both ends of the abutting portion 234 are basically flush with the outer side wall of the lamp holder body 21, so that the tightness and aesthetics of the combination between the bottom cover 23 and the lamp holder body 21 are guaranteed.

The foregoing descriptions are merely used to illustrate the technical solutions of the present disclosure, and are not intended to limit the present disclosure. Any other modifications or equivalent replacements made by those of ordinary skill in the art to the technical solutions of the present disclosure shall be covered by the scope of the claims of the present disclosure as long as they do not depart from the spirit and scope of the technical solutions of the present disclosure.

What is claimed is:

1. A decorative light bulb, comprising:

a base, having two electrical connection contacts;

a light-emitting unit, one end of the light-emitting unit being inserted into the base and connected to an interior of the base, the light-emitting unit having two electrodes, and the two electrodes being electrically connected to the two electrical connection contacts respectively;

a lamp pole, sleeved on the light-emitting unit, one end of the lamp pole close to the base being inserted into the base and connected to the base;

a lamp shade, detachably connected to the base, both the light-emitting unit and the lamp pole protruding out from the lamp shade and extending towards the side away from the base;

wherein a limiting portion protrudes from an inner side wall of the lower shade body on the side away from the upper shade body; a limiting platform and limiting blocks are disposed on an outer side wall of the mounting base in a protruding manner; and when the lower shade body is assembled with the mounting base, the limiting portion is limited between the limiting platform and the limiting blocks.

2. The decorative light bulb according to claim 1, wherein the limiting portion is provided with mounting notches, and the limiting blocks can enter the lower shade body through the mounting notches; and after the limiting blocks enter the lower shade body, the mounting base or the lower shade body is rotated to make the limiting blocks be matched with the limiting platform to limit and fix the limiting portion.

3. A decorative light bulb, comprising:

a base, having two electrical connection contacts;

a light-emitting unit, one end of the light-emitting unit being inserted into the base and connected to an interior of the base, the light-emitting unit having two electrodes, and the two electrodes being electrically connected to the two electrical connection contacts respectively;

a lamp pole, sleeved on the light-emitting unit, one end of the lamp pole close to the base being inserted into the base and connected to the base;

a lamp shade, detachably connected to the base, both the light-emitting unit and the lamp pole protruding out from the lamp shade and extending towards the side away from the base; and wherein a positioning column is disposed on an end face of the upper shade body on the side close to the lower shade body, and the lower shade body is provided with a positioning hole fitted with the positioning column.

4. The decorative light bulb according to claim 3, wherein a plurality of abutting sheets extending toward the side away from the upper shade body along the axis direction of the mounting hole are disposed on an inner side wall of the mounting hole, and abutting blocks are disposed on end faces of the plurality of abutting sheets on the sides close to the lamp pole in a protruding manner; and when the lamp pole passes through the mounting hole, the abutting blocks abut against an outer wall of the lamp pole so as to fix the lamp pole.

5. The decorative light bulb according to claim 4, wherein the upper shade body and the lower shade body are both provided with through holes.

6. A decorative light string, comprising a plurality of spliceable decorative lights, wherein each of the decorative lights comprises: the decorative light bulb according to claim 5; and a lamp holder, connected to the decorative light bulb, the lamp holder being configured to connect adjacent decorative light bulbs or to be connected to an external power source.

7. The decorative light string according to claim 6, wherein the lamp holder comprises:

a lamp holder body, having an assembly cavity, a positive electrode conductive sheet and a negative electrode conductive sheet being disposed inside the assembly cavity, and the decorative light bulb being installed inside the assembly cavity and electrically connected to the positive electrode conductive sheet and the negative electrode conductive sheet;

a power cord, a middle part of the power cord being separately connected to the positive electrode conductive sheet and the negative electrode conductive sheet, and a connector being disposed at an end portion of the power cord; and a bottom cover, detachably assembled with the lamp holder body, the bottom cover being configured to block one end of the lamp holder body away from the decorative light bulb, and to press and fix the power cord.

8. The decorative light string according to claim 7, wherein the lamp holder body is further provided with buckling portions and buckling holes, and the bottom cover comprises:

a blocking portion, connected to the lamp holder body;

an accommodating portion, connected to an end face of the blocking portion on the side away from the light-emitting unit;

buckling heads, extending into the buckling holes to be connected to the buckling portions so as to enable the bottom cover to be fixedly connected to the lamp holder body; and an abutting portion, abutted against the power cord, wherein after the buckling heads are connected to the buckling portions, the abutting portion abuts against the power cord so as to fix the power cord on the lamp holder body.

9. The decorative light string according to claim 8, wherein a positioning block is disposed at an edge of the blocking portion, and a positioning groove fitted with the positioning block is provided in the lamp holder body.

10. The decorative light string according to claim 9, wherein the lamp holder body is provided with a bayonet, and the power cord is accommodated inside the bayonet; the abutting portion is provided with a radially extending groove, and the power cord is accommodated within the groove; and the bayonet is matched with the groove to limit the power cord.

* * * * *